US010155199B2

(12) United States Patent
Sakai et al.

(10) Patent No.: US 10,155,199 B2
(45) Date of Patent: Dec. 18, 2018

(54) CONTROLLER FOR ENERGY GENERATION SYSTEM

(71) Applicant: KYOWAKIDEN INDUSTRY CO., LTD., Nagasaki (JP)

(72) Inventors: Hideyuki Sakai, Nagasaki (JP); Morihiro Irie, Nagasaki (JP); Shintaro Zaitsu, Nagasaki (JP)

(73) Assignee: KYOWAKIDEN INDUSTRY CO., LTD., Nagasaki (JP)

( * ) Notice: Subject to any disclaimer, the term of this patent is extended or adjusted under 35 U.S.C. 154(b) by 0 days.

(21) Appl. No.: 15/562,613

(22) PCT Filed: Aug. 25, 2016

(86) PCT No.: PCT/JP2016/074826
§ 371 (c)(1),
(2) Date: Sep. 28, 2017

(87) PCT Pub. No.: WO2017/033999
PCT Pub. Date: Mar. 2, 2017

(65) Prior Publication Data
US 2018/0085708 A1 Mar. 29, 2018

(30) Foreign Application Priority Data
Aug. 25, 2015 (JP) .................................. 2015-165556

(51) Int. Cl.
*B01D 61/00* (2006.01)
*B01D 61/06* (2006.01)
(Continued)

(52) U.S. Cl.
CPC ........... *B01D 61/002* (2013.01); *B01D 61/06* (2013.01); *B01D 61/12* (2013.01); *B01D 61/36* (2013.01);
(Continued)

(58) Field of Classification Search
CPC ...... B01D 61/002; B01D 61/36; B01D 61/06; B01D 61/10; B01D 61/12; B01D 61/22;
(Continued)

(56) References Cited

U.S. PATENT DOCUMENTS 6,391,205 B1 * 5/2002 McGinnis ............ B01D 61/002
210/644
6,535,795 B1 * 3/2003 Schroeder ............ G05B 13/029
210/143

(Continued)

FOREIGN PATENT DOCUMENTS

| JP | 2009-47012 | 3/2009 |
| JP | 2009-521306 | 6/2009 |

(Continued)

OTHER PUBLICATIONS

Terashima, "Permeation charateristics of fresh water flow in hollow fiber membrane module", Reports of Graduate School of Engineering, Nagasaki University [online], Nov. 2, 2016, pp. 44-50, vol. 45, No. 84.

(Continued)

*Primary Examiner* — Joseph W Drodge
(74) *Attorney, Agent, or Firm* — Greenblum & Bernstein, P.L.C.

(57) ABSTRACT

Provided is a controller for an energy generation system, the controller exerting optimum control so that, while a waste of energy is eliminated, any operation trouble is not caused. The controller for the energy generation system of the present invention is a controller for an energy generation system that uses a forward osmosis membrane, the controller including: a first regulation unit for regulating the discharge of non-permeating water from the forward osmosis membrane; a second regulation unit for regulating the supply of fresh water to the forward osmosis membrane; a third regulation unit for regulating the supply of salt water to the (Continued)

forward osmosis membrane; a fourth regulation unit for regulating the discharge of mixed water from the forward osmosis membrane; and a control unit for controlling the first regulation unit, the second regulation unit, the third regulation unit, and the fourth regulation unit.

12 Claims, 13 Drawing Sheets

(51) Int. Cl.
      *B01D 61/12*        (2006.01)
      *C02F 1/44*         (2006.01)
      *F03G 7/00*         (2006.01)
      *B01D 61/36*        (2006.01)
      *C02F 1/00*         (2006.01)

(52) U.S. Cl.
     CPC ............ *C02F 1/008* (2013.01); *C02F 1/44* (2013.01); *F03G 7/00* (2013.01); *F03G 7/005* (2013.01); *B01D 2311/14* (2013.01); *B01D 2311/16* (2013.01); *B01D 2311/246* (2013.01); *C02F 1/445* (2013.01); *C02F 2209/006* (2013.01); *C02F 2209/40* (2013.01)

(58) Field of Classification Search
     CPC ............ B01D 2311/14; B01D 2311/16; B01D 2311/20; B01D 2311/22; B01D 2315/18; B01D 2315/20; C02F 1/008; C02F 1/445; C02F 1/44; C02F 1/441; C02F 2303/10; C02F 2209/005; C02F 2209/006; C02F 2209/03; C02F 2209/05; C02F 2209/40; C02F 2209/44; F03G 7/00; F03B 13/00; F03B 13/06; F03B 15/02; F03B 15/06; F03B 15/14; F03B 17/06

USPC ...... 210/637, 650, 652, 96.2, 138, 141–143, 210/321.6, 321.65, 321.66; 290/43, 52, 290/54

See application file for complete search history.

(56) References Cited

U.S. PATENT DOCUMENTS

| | | | |
|---|---|---|---|
| 9,751,046 B2* | 9/2017 | Sakai | C02F 1/445 |
| 2002/0043487 A1* | 4/2002 | Schick | B01D 61/145 210/85 |
| 2009/0008330 A1 | 1/2009 | Thorsen et al. | |
| 2009/0071902 A1 | 3/2009 | Stover et al. | |
| 2010/0183903 A1* | 7/2010 | McGinnis | F03G 7/005 429/50 |
| 2010/0267307 A1* | 10/2010 | Park | B23K 26/206 445/25 |
| 2011/0036774 A1* | 2/2011 | McGinnis | B01D 61/002 210/652 |
| 2012/0267307 A1* | 10/2012 | McGinnis | B01D 61/002 210/638 |
| 2013/0160435 A1* | 6/2013 | Ordonez Fernandez | B01D 61/002 60/327 |
| 2014/0007564 A1 | 1/2014 | Efraty | |

FOREIGN PATENT DOCUMENTS

| | | |
|---|---|---|
| JP | 2009-536878 | 10/2009 |
| JP | 2014-34946 | 2/2014 |

OTHER PUBLICATIONS

Search Report issued in Japan Patent Application No. PCT/JP2016/074826, dated Nov. 15, 2016.

* cited by examiner

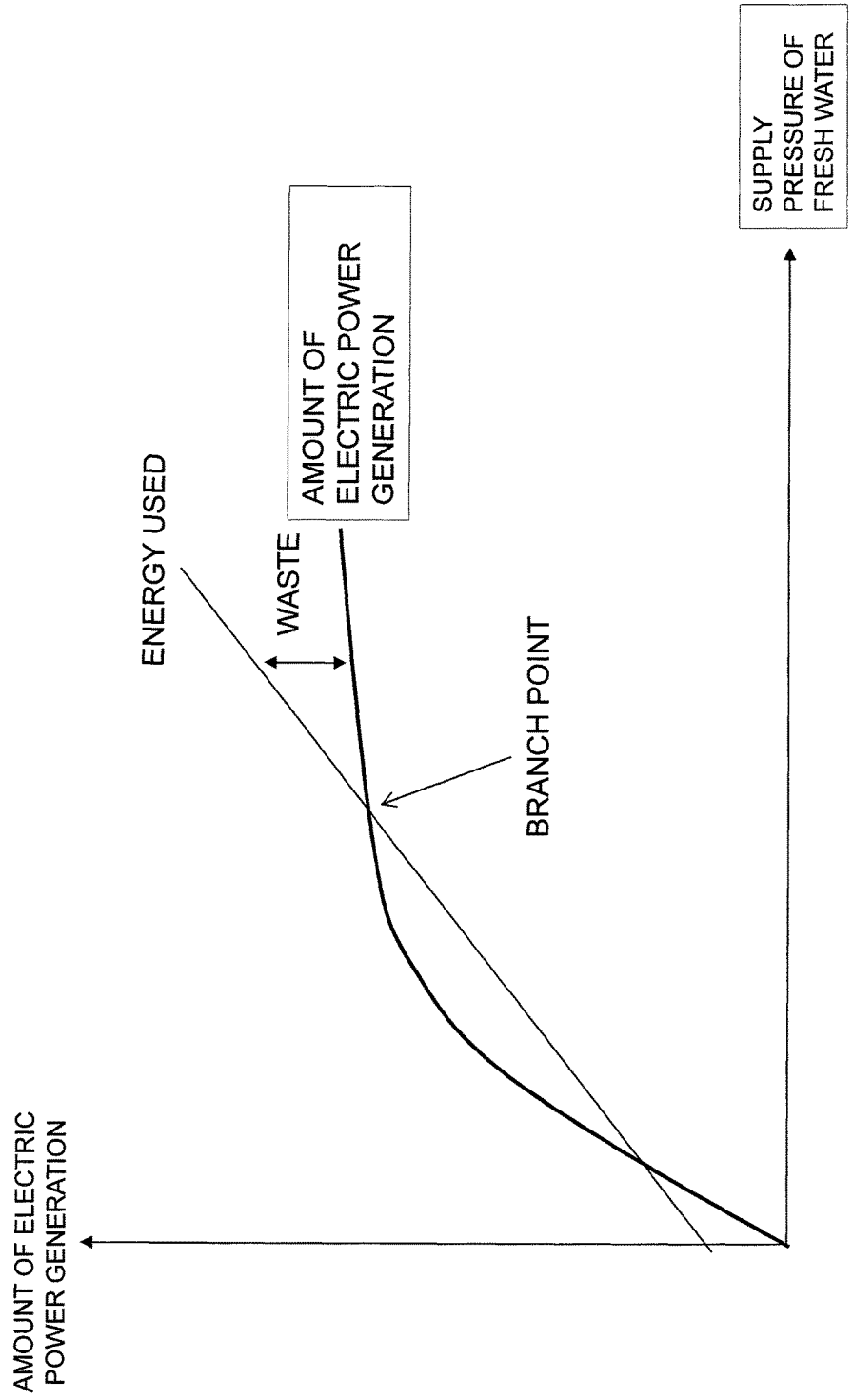

CONTROLLER FOR ENERGY GENERATION SYSTEM

TECHNICAL FIELD

The present invention relates to a controller for an energy generation system that generates energy by making use of a forward osmosis membrane.

BACKGROUND ART

In recent years, an energy generation system that generates energy by making use of a forward osmosis membrane has come to be used. The forward osmosis membrane has a configuration illustrated in FIG. 11 and FIG. 12, in which, when salt water is supplied to a salt water passage of the forward osmosis membrane and fresh water is supplied to a fresh water passage of the forward osmosis membrane, fresh water permeates the salt water passage from the fresh water passage. FIG. 11 is a schematic diagram illustrating the configuration of the forward osmosis membrane, and FIG. 12 is a schematic diagram for describing an osmosis phenomenon in the forward osmosis membrane.

As illustrated in FIG. 11, a forward osmosis membrane 100 includes: a salt water passage 102 to which salt water is supplied and through which salt water passes; and a fresh water passage 101 to which fresh water is supplied and through which fresh water passes. Salt water is supplied to the salt water passage 102. Likewise, fresh water is supplied to the fresh water passage 101. The forward osmosis membrane 100 further includes a separation membrane 103. As indicated by an arrow in FIG. 12, fresh water permeates the salt water passage 102 from the fresh water passage 101 via the separation membrane 103.

As a result of this osmosis phenomenon, on the salt water passage 102 side, the permeating fresh water is added to the supplied salt water, whereby mixed water is produced. The pressure on the salt water passage 102 side is higher than that on the fresh water passage 101 side. The mixed water has a water amount increased by the fresh water while maintaining the high pressure of the salt water.

On the other hand, on the fresh water passage 101 side, fresh water that has not permeated the salt water passage 102 passes through the fresh water passage 101 as it is, and flows out as non-permeating water. This non-permeating water is only required to be discharged.

The mixed water has the same high pressure as that of the supplied salt water. The permeation of fresh water causes an increase in the amount of water having a high pressure, thereby allowing energy to be generated. For example, the mixed water having a relatively increased water amount allows the generation of electric power and the operation of machines. In other words, the mixed water allows the generation of energy.

At this time, the water amount of the mixed water is larger than that of salt water supplied to the salt water passage 102. This differential in water amount leads to energy generated by the mixed water produced via the forward osmosis membrane 100. In other words, energy generated based on this differential in water amount is energy newly generated by the mixed water.

With the mixed water thus-produced by an osmosis phenomenon, the forward osmosis membrane 100 allows the generation of energy higher than energy in the case where only salt water is used.

The energy generated by the mixed water in the forward osmosis membrane 100 can be put to various uses. For example, the use of the mixed water for the rotation of a turbine allows electric power to be generated. In other words, a differential in energy caused by a differential in the amount of flow between salt water before supplied and the mixed water is energy generated in the forward osmosis membrane 100, and, with thus-generated energy, electric power can be newly generated.

Alternatively, when the mixed water is used for operating a pump or a machine, a differential in the amount of flow similarly causes a difference in the amount of energy, thereby yielding a new operation. In other words, an energy generation system that uses the forward osmosis membrane 100 is capable of generating a differential energy that corresponds to, for example, the generation of electric power or the operation of machines.

The forward osmosis membrane 100 can be thus used as an energy generation device. As a result, an energy generation system that uses the forward osmosis membrane 100 has been proposed (for example, refer to Patent Literature 1).

On the other hand, as described above, energy generated by the energy generation system using the forward osmosis membrane 100 is based on a differential in the amount of flow between salt water before supplied to the forward osmosis membrane 100 and the mixed water. This is because, without the differential in the amount of flow, the differential between the amount of energy owing to the salt water before supplied and the amount of energy owing to the mixed water is not made, and hence, it cannot be said that energy is newly generated.

Furthermore, the energy generation system that uses the forward osmosis membrane 100 needs energy to be used related to, for example, the supply of salt water or fresh water or the discharge of the mixed water and non-permeating water. In other words, the net amount of energy generated by the energy generation system is an amount obtained by subtracting energy used from energy generated by the mixed water. Even in the case where the amount of energy generated by the mixed water is large, when the energy used is too large, the energy generation system that uses the forward osmosis membrane 100 becomes useless.

CITATION LIST

Patent Literature

PTL 1: Japanese Patent Application Laid-Open No. 2014-34946

PTL 2: Japanese Patent Application Laid-Open No. 2009-47012

SUMMARY OF INVENTION

Technical Problem

Patent Literature 1 discloses an osmotic-pressure electric power generation system that includes: a semipermeable membrane device 12 having a semipermeable membrane 13, a high concentration water compartment 14 to which concentrated sea water produced at the time of desalination of sea water at a seawater desalination plant 31 is supplied, and a low concentration water compartment 15 to which sea water is supplied; and an electric generator 16 that generates electric power by rotating a turbine 17. To concentrated sea water supplied to the high concentration water compartment 14, a solute 20 for further increasing an osmotic pressure is added. The osmotic-pressure electric power generation system further includes a hyperosmotic liquid regenerative device 21 that recovers the solute 20 contained in the concentrated sea water after the rotation of the turbine 17, and allows the solute 20 to be reused in the high concentration water compartment 14.

Patent Literature 2 discloses an osmotic-pressure electric power generation system that includes: an osmotic device 2 having a sea water passage 31 and a fresh water passage 41 which are formed in isolation from each other on both sides of a semipermeable membrane 1, respectively; a sea water supply channel 32 and a sea water drainage channel 33 which are communicated with the sea water passage 31; a fresh water supply channel 42 and a fresh water drainage channel 43 which are communicated with the fresh water passage 41; a sea water supply pump 51 provided in the sea water supply channel 32; a fresh water supply pump 52 provided in the fresh water supply channel 42; and a hydraulic turbine generator 8 provided in the sea water drainage channel 33 and configured to rotate by the flow of sea water drainage to generate electric power, wherein a permeation amount regulation means for regulating the amount of permeation from the fresh water passage 31 to the sea water passage 41 is provided.

However, in Patent Literature 1, for example, the supply of fresh water and salt water and the discharge of the non-permeating water and the mixed water are not appropriately controlled in an energy generation system that uses a forward osmosis membrane. In particular, the supply of fresh water, the supply of salt water, the discharge of the non-permeating water, and the discharge of the mixed water are not subject to control by correlating them with each other or ordering them.

The supply of fresh water, the supply of salt water, the discharge of the non-permeating water, and the discharge of the mixed water are operations that are correlated with each other. Hence, when these operations are controlled without being correlated with each other or ordered, an operation in the forward osmosis membrane is not appropriately effected, and sometimes an osmosis phenomenon excessively occurs or an osmosis phenomenon less occurs, accordingly. Due to a trouble in an osmosis phenomenon, a problem arises that energy is not appropriately generated. Or, a problem arises that, when the supply of fresh water, the supply of salt water, the discharge of the non-permeating water, and the discharge of the mixed water are simultaneously controlled, energy is excessively generated or less generated.

When these problems arise, the amount of energy generated by the energy generation system does not sufficiently exceed the amount of energy used, and the energy generation system fails to function sufficiently.

FIG. 13 is a graph illustrating a relationship between the amount of electric power generation in the forward osmosis membrane and the supply pressure of fresh water. The horizontal axis indicates the supply pressure of fresh water, and the vertical axis indicates the amount of electric power generation, which is proportional to the amount of permeation in the forward osmosis membrane. The value of the amount of electric power generation becomes larger as the supply pressure of fresh water on the forward osmosis membrane increases. However, with the capability of the forward osmosis membrane, this value gradually becomes constant as shown by a curve in FIG. 13. The proportionality line in the graph in FIG. 13 indicates energy used necessary for an energy generation system. The energy used increases almost linearly.

As is clear from this graph, a state in which energy used is above the curve of the amount of electric power genera-tion indicates a state in which energy generated by the energy generation system is wasted. A portion expressed as a waste in the graph indicates a state in which energy used is larger than energy generated. Hence, a portion up to a branch point indicates a state in which energy generation in the energy generation system using the forward osmosis membrane is useful.

In Patent Literature 1, the correlation between, for example, the supply of fresh water as shown in this graph and the supply or discharge of others, and the priority order among them are not taken into consideration. Therefore, there is a possibility that energy increases beyond a branch point of the graph, which results in a waste of the energy. Such waste is sometimes caused during part of period of operation of the energy generation system.

In the energy generation system that uses the forward osmosis membrane, it is necessary to generate energy before reaching the branch point in the graph in FIG. 13. Furthermore, it is also necessary not to cause an out-of-control operation and an operation stop of the forward osmosis membrane.

Prior arts have a problem in that these controls have not been sufficiently exerted.

An object of the present invention is to solve these problems and provide a controller for an energy generation system, the controller exerting optimum control so that a waste of energy is eliminated, and any operation trouble is not caused.

Solution to Problems

In view of the above-described problems, a controller for an energy generation system that uses a forward osmosis membrane according to the present invention has been conceived, the controller including:

a first regulation unit for regulating the discharge of non-permeating water from the forward osmosis membrane;

a second regulation unit for regulating the supply of fresh water to the forward osmosis membrane;

a third regulation unit for regulating the supply of salt water to the forward osmosis membrane;

a fourth regulation unit for regulating the discharge of mixed water from the forward osmosis membrane; and a control unit for controlling the first regulation unit, the second regulation unit, the third regulation unit, and the fourth regulation unit, wherein the control unit controls the first regulation unit, the second regulation unit, the third regulation unit, and the fourth regulation unit according to a priority order.

Advantageous Effects of Invention

The controller for the energy generation system according to the present invention is capable of optimizing the amount of energy generated with respect to energy used in the energy generation system that uses a forward osmosis membrane. In particular, the controller is capable of preventing energy used from being larger than energy generated.

Furthermore, the controller for the energy generation systems according to the present invention is capable of reducing the occurrence of inappropriate operations, such as an out-of-control operation and an operation stop of the forward osmosis membrane, in energy generation by making use of the forward osmosis membrane. As a result, the occurrence of inappropriate events in energy generation using the mixed water from the forward osmosis membrane can be reduced.

BRIEF DESCRIPTION OF DRAWINGS

FIG. 13 is a graph illustrating a relationship between the amount of electric power generation in the forward osmosis membrane and the supply pressure of fresh water.

DESCRIPTION OF EMBODIMENTS

Figure 1:
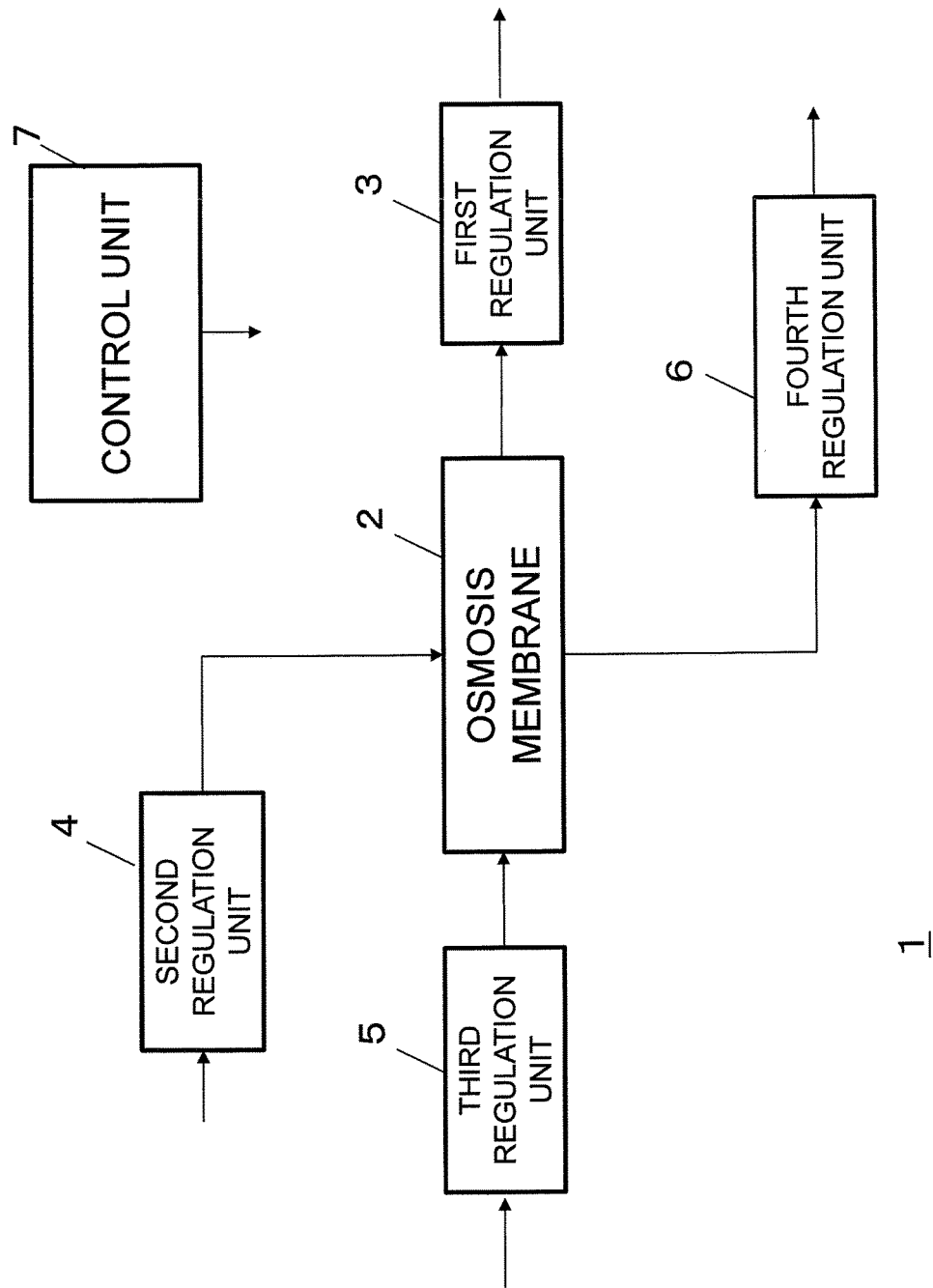
FIG. 1 is a block diagram illustrating a controller for an energy generation system in Embodiment 1 of the present invention.

A controller for an energy generation system according to a first aspect of the present invention is a controller for an energy generation system that uses a forward osmosis membrane, the controller including:

a first regulation unit for regulating the discharge of non-permeating water from the forward osmosis membrane;

a second regulation unit for regulating the supply of fresh water to the forward osmosis membrane;

a third regulation unit for regulating the supply of salt water to the forward osmosis membrane;

a fourth regulation unit for regulating the discharge of mixed water from the forward osmosis membrane; and a control unit for controlling the first regulation unit, the second regulation unit, the third regulation unit, and the fourth regulation unit, wherein the control unit controls the first regulation unit, the second regulation unit, the third regulation unit, and the fourth regulation unit according to a priority order.

This configuration allows the controller to optimize the efficiency of energy generation with respect to energy used.

In the controller for the energy generation system according to a second aspect of the present invention, in addition to the first aspect, the forward osmosis membrane includes: a salt water passage through which salt water supplied by the third regulation unit passes; and a fresh water passage through which fresh water supplied by the second regulation unit passes, and the mixed water is generated by an osmosis phenomenon in the forward osmosis membrane.

This configuration allows the mixed water having a differential in the amount of flow to generate energy.

In the controller for the energy generation system according to a third aspect of the present invention, in addition to the first or second aspect, the control unit is capable of outputting:

a first control signal for performing regulation in the first regulation unit;

a second control signal for performing regulation in the second regulation unit;

a third control signal for performing regulation in the third regulation unit; and a fourth control signal for performing regulation in the fourth regulation unit.

This configuration allows the control unit to output the first control signal and other signals, thereby controlling the first to fourth regulation units with fixing a priority order.

In the controller for the energy generation system according to a fourth aspect of the present invention, in addition to the third aspect, the priority order is as follows: in terms of the number of times the control unit outputs each of the control signals in a fixed period, the first control signal≥the second control signal≥the third control signal≥the fourth control signal.

This configuration allows a priority order among the first to fourth regulation units to be determined by the number of times that the control signals are outputted.

In the controller for the energy generation system according to a fifth aspect of the present invention, in addition to the third aspect, the priority order is as follows: in terms of the amount of time the control unit outputs each of the control signals in a fixed period, the first control signal≥the second control signal≥the third control signal≥the fourth control signal.

This configuration allows a priority order among the first to fourth regulation units to be determined by the amount of time to output the control signals.

In the controller for the energy generation system according to a sixth aspect of the present invention, in addition to the third aspect, the priority order is as follows: in terms of the frequency with which the control unit outputs each of the control signals in a fixed period, the first control signal≥the second control signal≥the third control signal≥the fourth control signal.

This configuration allows a priority order among the first to fourth regulation units to be determined by the frequency of output of the control signals.

In the controller for the energy generation system according to a seventh aspect of the present invention, in addition to the third aspect, the priority order is such that an order in which the control unit outputs the control signals in a fixed period is the first control signal, the second control signal, the third control signal, and then the fourth control signal.

This configuration allows a priority order among the first to fourth regulation units to be determined by the order of the control signals.

In the controller for the energy generation system according to an eighth aspect of the present invention, in addition to any one of the third to seventh aspects, the first control signal controls the first regulation unit so as to keep the discharge of non-permeating water approximately constant.

This configuration allows the first regulation unit to maintain the discharge of non-permeating water approximately constant. Furthermore, since the first regulation unit has a higher priority, a constant discharge of non-permeating water can be realized, and the efficiency of energy generation can be optimized.

In the controller for the energy generation system according to a ninth aspect of the present invention, in addition to any one of the third to eighth aspects, the second control signal controls the second regulation unit so as to keep the supply pressure of fresh water to the forward osmosis membrane approximately constant.

This configuration allows the second regulation unit to keep the supply pressure of fresh water constant. Furthermore, since the second regulation unit has the second priority, the supply of fresh water which is related to the amount of permeation is optimized, and accordingly, the efficiency of energy generation is enhanced.

In the controller for the energy generation system according to a tenth aspect of the present invention, in addition to the ninth aspect, the second control signal controls the second regulation unit, based on at least one of the amount of discharge of the mixed water and the discharge pressure of the mixed water.

This configuration allows the second regulation unit to optimize the supply of fresh water while monitoring, for example, the amount of discharge of the mixed water. As a result, the supply of fresh water which is related to the amount of permeation is optimized based on the production of the mixed water, and accordingly, the efficiency of energy generation is enhanced.

In the controller for the energy generation system according to an eleventh aspect of the present invention, in addition to any one of the third to tenth aspects, the third control signal controls the third regulation unit so as to keep the supply of salt water to the forward osmosis membrane approximately constant.

This configuration allows the third regulation unit to keep the supply of salt water to the forward osmosis membrane constant, and accordingly, the impact on energy generation can be reduced.

In the controller for the energy generation system according to a twelfth aspect of the present invention, in addition to any one of the third to eleventh aspects, the fourth control signal controls the fourth regulation unit so as to keep the discharge pressure of the mixed water approximately constant.

This configuration allows the efficiency of energy generation to be optimized.

In the controller for the energy generation system according to a thirteenth aspect of the present invention, in addition to the twelfth aspect, the fourth control signal controls the fourth regulation unit, based on the salt concentration of the mixed water, so as to keep the discharge pressure of the mixed water approximately constant.

This configuration allows the discharge pressure of the mixed water to be kept constant, while the salt concentration of the mixed water to be maintained constant. As a result, the efficiency of energy generation can be optimized.

Hereinafter, with reference to the drawings, Embodiments of the present invention will be described.

(Embodiment 1)
(General Outline)

First, the general outline of a controller for an energy generation system in Embodiment 1 of the present invention will be described. FIG. 1 is a block diagram illustrating the controller for the energy generation system in Embodiment 1 of the present invention. A controller 1 for an energy generation system (hereinafter, referred to as "controller") in FIG. 1 is used for an energy generation system that generates energy by using mixed water produced in a forward osmosis membrane 2. The energy generation system extracts energy by making use of the increased pressure of the mixed water produced in the forward osmosis membrane 2. This extracted energy is made use of by an electric generator, or is made use of in machine operation. In other words, the controller 1 is used in the energy generation system that uses the forward osmosis membrane 2.

The controller 1 includes a first regulation unit 3, a second regulation unit 4, a third regulation unit 5, a fourth regulation unit 6, and a control unit 7. The control unit 7 outputs required control signals to the first regulation unit 3, the second regulation unit 4, the third regulation unit 5, and the fourth regulation unit 6, respectively. For this, the control unit 7 is connected to the first regulation unit 3 and other units so that the control signals can be sent and received therebetween. However, in FIG. 1, these connection channels are omitted for ease of seeing the figure.

The first regulation unit 3 regulates the discharge of non-permeating water from the forward osmosis membrane 2. The second regulation unit 4 regulates the supply of fresh water to the forward osmosis membrane 2. The third regulation unit 5 regulates the supply of salt water to the forward osmosis membrane 2. The fourth regulation unit 6 regulates the discharge of mixed water from the forward osmosis membrane 2.

To each of the first regulation unit 3, the second regulation unit 4, the third regulation unit 5, and the fourth regulation unit 6, the control unit 7 outputs a corresponding one of control signals for controlling a regulation operation in each regulation unit. Furthermore, the control unit 7 controls the first regulation unit 3, the second regulation unit 4, the third regulation unit 5, and the fourth regulation unit 6 according to a priority order. Unlike prior arts, such control according to a priority order allows the energy generation system to be operated without causing an imbalance between energy used and energy generated and a waste of energy.

Figure 2:
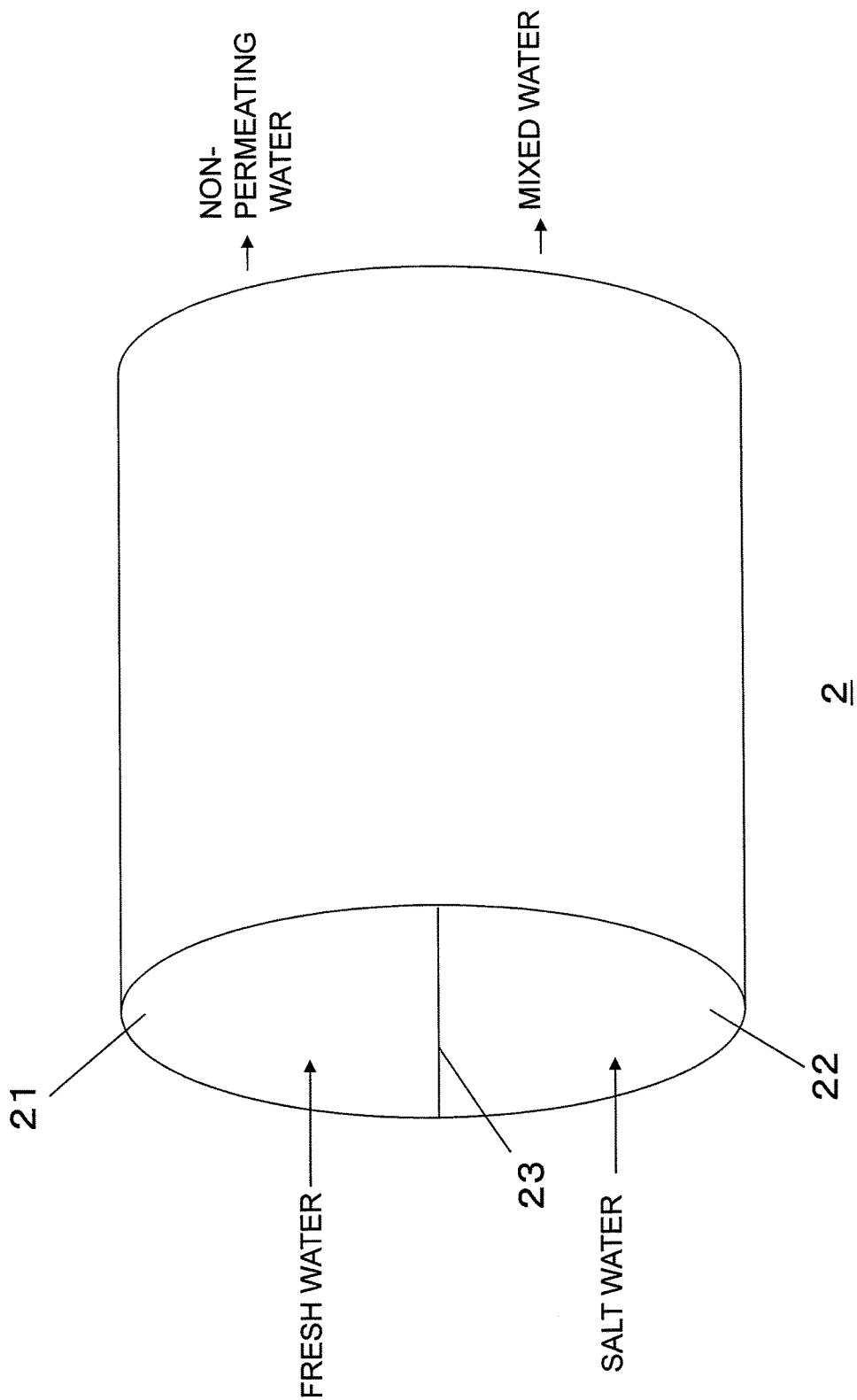
FIG. 2 is a schematic diagram illustrating a forward osmosis membrane in Embodiment 1 of the present invention.

FIG. 2 is a schematic diagram illustrating the forward osmosis membrane in Embodiment 1 of the present invention. FIG. 2 illustrates the function of the forward osmosis membrane 2 so as to make it easier to understand. The forward osmosis membrane 2 has a separation membrane 23 thereinside. The separation membrane 23 separates the inside of the forward osmosis membrane 2 into a fresh water passage 21 and a salt water passage 22. Fresh water is supplied to the fresh water passage 21 via the second regulation unit 4. Salt water is supplied to the salt water passage 22 via the third regulation unit 5.

In the forward osmosis membrane 2, with the function of the separation membrane 23, moisture in the fresh water passage 21 permeates the salt water passage 22. Thus, salt water supplied and fresh water permeating from the separation membrane 23 are supplied to the salt water passage 22. As a result, in the salt water passage 22, mixed water in which these salt water and permeating fresh water are mixed is produced. The salt water passage 22 discharges this mixed water.

It should be noted that, for ease of understanding, FIG. 2 illustrates a structure in which the inside of the forward osmosis membrane 2 is divided into the fresh water passage 21 and the salt water passage 22, but, not only this structure, the forward osmosis membrane 2 may have a structure in which a plurality of thin tubes are housed inside the forward osmosis membrane 2, and the inside of each of the thin tubes serves as one of the passages, namely, the fresh water passage 21 or the salt water passage 22, whereas the remaining region, other than the thin tubes, inside the forward osmosis membrane serves as the other passage, namely, the salt water passage 22 or the fresh water passage 21.

On the other hand, not all the fresh water supplied to the fresh water passage 21 permeates the salt water passage 21 via the separation membrane 23. Fresh water not having permeated the salt water passage 21 is discharged as non-permeating water from the fresh water passage 21.

The flow amount of the mixed water is larger than that of the salt water supplied to the forward osmosis membrane 2, and this differential in the amount of flow is offered as additional energy which the mixed water has.

In FIG. 1, the first regulation unit 3 regulates the non-permeating water to be discharged from the forward osmosis membrane 2. For example, the volume, the pressure, and the volume per unit time of the non-permeating water to be discharged from the forward osmosis membrane 2 are regulated. At this time, the control unit 7 outputs the first control signal for performing regulation in the first regulation unit 3 to the first regulation unit 3.

In FIG. 1, the second regulation unit 4 regulates fresh water to be supplied to the forward osmosis membrane 2. The fresh water passage 21 of the forward osmosis membrane 2 is connected to a fresh water supply channel for supplying fresh water from the outside. The second regulation unit 4 regulates the supply of fresh water in this fresh water supply channel. For example, the second regulation unit 4 regulates the volume, the pressure, and the volume per unit time of fresh water to be supplied to the forward osmosis membrane 2. Here, the control unit 7 outputs the second control signal for performing regulation in the second regulation unit 4 to the second regulation unit 4.

In FIG. 1, the third regulation unit 5 regulates salt water to be supplied to the forward osmosis membrane 2. For example, the salt water passage 22 of the forward osmosis membrane 2 is connected to a salt water supply channel for supplying salt water from the outside. The third regulation unit 5 regulates the supply of salt water in this salt water supply channel. For example, the third regulation unit 5 regulates the volume, the pressure, and the volume per unit time of salt water to be supplied to the forward osmosis membrane 2. Here, the control unit 7 outputs the third control signal for performing regulation in the third regulation unit 5 to the third regulation unit 5.

In FIG. 1, the fourth regulation unit 6 regulates mixed water to be discharged from the forward osmosis membrane 2. In the forward osmosis membrane 2, fresh water permeates the salt water passage 22 from the fresh water passage 21. As a result of this permeation, in the salt water passage 22, mixed water in which the fresh water having permeated is added to supplied salt water is produced. The forward osmosis membrane 2 discharges this mixed water. As described above, there is a differential in the amount of flow between this mixed water and salt water supplied to the forward osmosis membrane 2. This differential in the amount of flow causes energy to be generated. The fourth regulation unit 6 regulates the volume, the pressure, the volume per unit time, and the like of the mixed water having such differential in the amount of flow at the time of discharge thereof. Here, the control unit 7 outputs the fourth control signal for performing regulation in the fourth regulation unit 6.

As described above, the controller 1 is capable of controlling the first regulation unit 3 to the fourth regulation unit 6 by using the first control signal, the second control signal, the third control signal, and the fourth control signal each outputted from the control unit 7. In this control, the first regulation unit 3 to the fourth regulation unit 6 are controlled according to a priority order. Such control according to a priority order allows energy generation in which energy is efficiently generated with respect to energy used.

In particular, the control unit 7 controls the first regulation unit 3 to the fourth regulation unit 6 by using the first control signal to the fourth control signal according to a priority order (by correlating the controls with each other). This control according to a priority order (correlation) allows sufficiently-efficient energy generation with respect to energy used.

(Priority Order)

Next, priority orders among the first regulation unit 3 to the fourth regulation unit 6 that are controlled by the control unit 7 will be described.

(The Number of Times Control Signal is Outputted)

The control unit 7 outputs the first to fourth control signals, thereby controlling the first regulation unit 3 to the fourth regulation unit 6, respectively. Here, one of the priority orders is as follows: in terms of the number of times the control unit 7 outputs each of the first to fourth control signals in a fixed period, the first control signal≥the second control signal≥the third control signal≥the fourth control signal.

Figure 3:
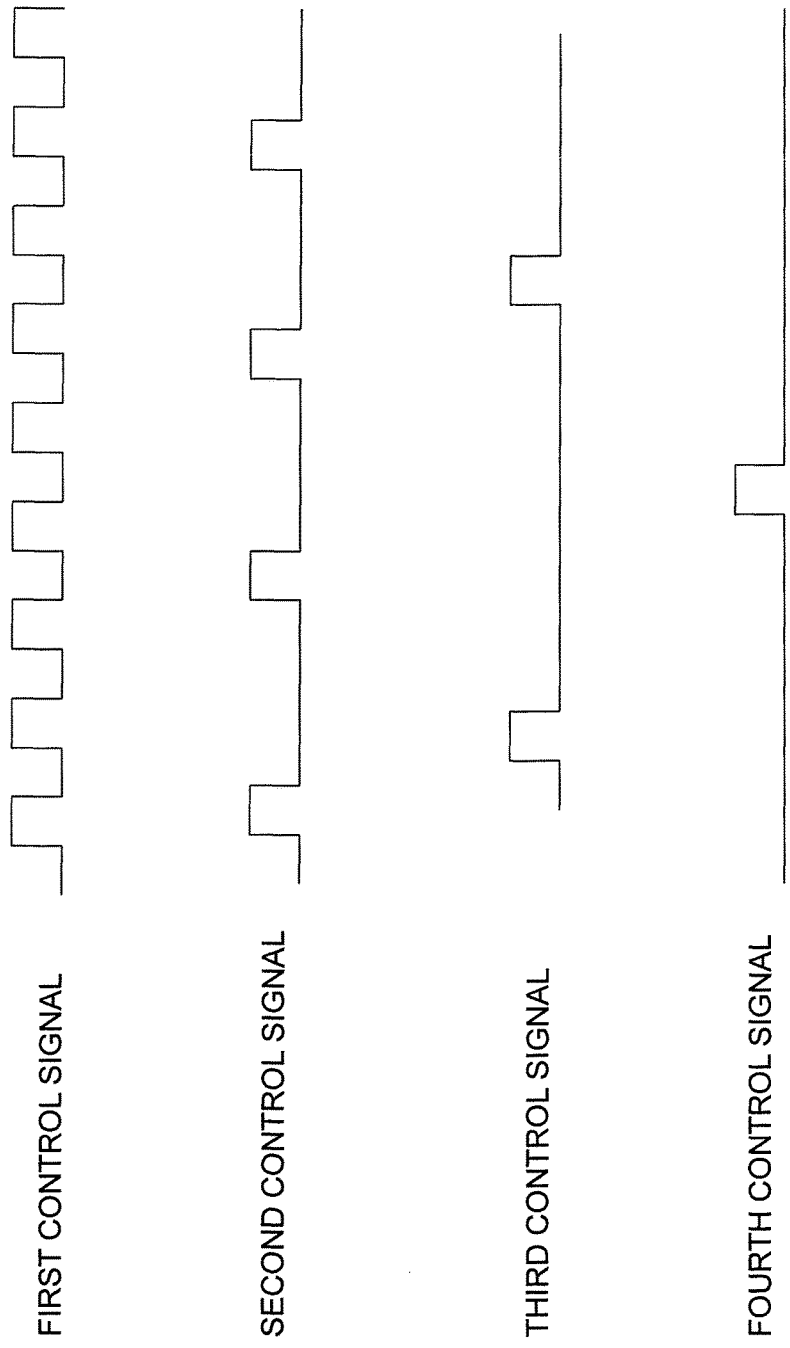
FIG. 3 is a timing chart illustrating the output states of first to fourth control signals in Embodiment 1 of the present invention.

FIG. 3 is a timing chart illustrating the output states of the first to fourth control signals in Embodiment 1 of the present invention. The timing chart of FIG. 3 illustrates, in the order from top to bottom, the outputs of the first control signal, the second control signal, the third control signal, and the fourth control signal. In the chart of a control signal, a portion edged upward represents the output timing of the control signal.

As is clear from the timing chart of FIG. 3, the number of times the first control signal is outputted in a fixed period is the largest. The number of times the second control signal is outputted is the second largest. The number of times the third control signal is outputted is the third largest. The number of times the fourth control signal is outputted is the smallest.

As described above, the control unit 7 determines a priority order among the first to fourth control signals based on the number of times of the output in a fixed period. In other words, the control unit 7 determines a priority order of regulation among the first regulation unit 3 to the fourth regulation unit 6, based on the number of times of the output in a fixed period. The difference in the number of times of the output as illustrated in FIG. 3 allows the control unit 7 to determine that the first regulation unit 3, the second regulation unit 4, the third regulation unit 5, and the fourth regulation unit 6 are prioritized in this order.

The controller 1 has a problem that, when the flow amount of discharge of non-permeating water decreases, the amount of permeation in the forward osmosis membrane 2 decreases. When the amount of permeation decreases, variations in the flow amount of produced mixed water arise. Hence, the discharge of non-permeating water is preferably always approximately constant. On the other hand, the amount of discharge of non-permeating water is easily affected by the amount of supply of fresh water, and hence, it is a very delicate task to maintain the discharge constant. When the discharge of non-permeating water varies, a priority in the amount of energy generated over that of energy used is sometimes insufficient.

In order to obtain energy generated which has priority over energy used, it is important that such delicate discharge of non-permeating water is maintained approximately constant.

Therefore, the control unit 7 gives the highest priority to the regulation of discharge of mixed water in the first regulation unit 3. This manifests in the number of times the first control signal is outputted.

Fresh water supplied to the forward osmosis membrane 2 causes a change in the amount of permeation in the forward osmosis membrane 2 and also causes a great change in the amount of energy used for supplying the fresh water. Therefore, the regulation of the supply of fresh water in the second regulation unit 4 causes a change in the amount of permeation (which leads to a change in the amount of energy generated) and causes a change in the amount of energy used. In order to cause these two changes, the regulation in the second regulation unit 4 needs to be delicately performed.

Hence, the control unit 7 gives the second priority to the regulation of supply of fresh water in the second regulation unit 4. This manifests in the number of times the second control signal is outputted.

When salt water is controlled so as to be supplied to the forward osmosis membrane 2 in an appropriate flow amount, energy output is less affected. Hence, for optimization of energy generated, it is preferable that the third regulation unit 5 for regulating the supply of salt water to the forward osmosis membrane 2 is less controlled than the first regulation unit 3 and the second regulation unit 4.

In other words, the control unit 7 gives the third priority to the regulation of supply of salt water in the third regulation unit 5. This manifests in the number of times the third control signal is outputted.

The discharge of the mixed water is only required to be regulated when the salt concentration of salt water supplied varies to some extent. However, a variation in the salt concentration of salt water supplied is small, hence, the necessity to control the discharge of the mixed water frequently is small. In other words, the control of the fourth regulation unit 6 for regulating the discharge of the mixed water may have a lower priority than the control of other regulation units.

That is, the control unit 7 gives the fourth priority to the regulation of discharge of the mixed water in the fourth regulation unit 6. This manifests in the number of times the fourth control signal is outputted.

(Amount of Time of Control Signal)

One of the priority orders is as follows: in terms of the amount of time the control unit 7 outputs each of the first to fourth control signals in a fixed period, the first control signal≥the second control signal≥the third control signal≥the fourth control signal.

The control unit 7 outputs the first to fourth control signals to the first regulation unit 3 to the fourth regulation unit 6, respectively. As illustrated in the timing chart in FIG. 3, the control unit 7 outputs each of the first to fourth control signals once, or two or more times. Also depending on the number of times of the output, the amount of time each of the first to fourth control signals is outputted differs from that of another. For example, as illustrated in the timing chart in FIG. 3, the amount of time of the output may differ, depending on the difference in the number of times of the output in a fixed period. In other words, when the number of times of the output is such that the first control signal≥the second control signal≥the third control signal≥the fourth control signal, the amount of time of the output becomes such that the first control signal≥the second control signal≥the third control signal≥the fourth control signal.

Alternatively, when a priority order for the control unit 7 to control the first regulation unit 3 to the fourth regulation unit 6 is as follows: the first control signal≥the second control signal≥the third control signal≥the fourth control signal, the length of time to output each of the control signals is sometimes longer.

Figure 4:
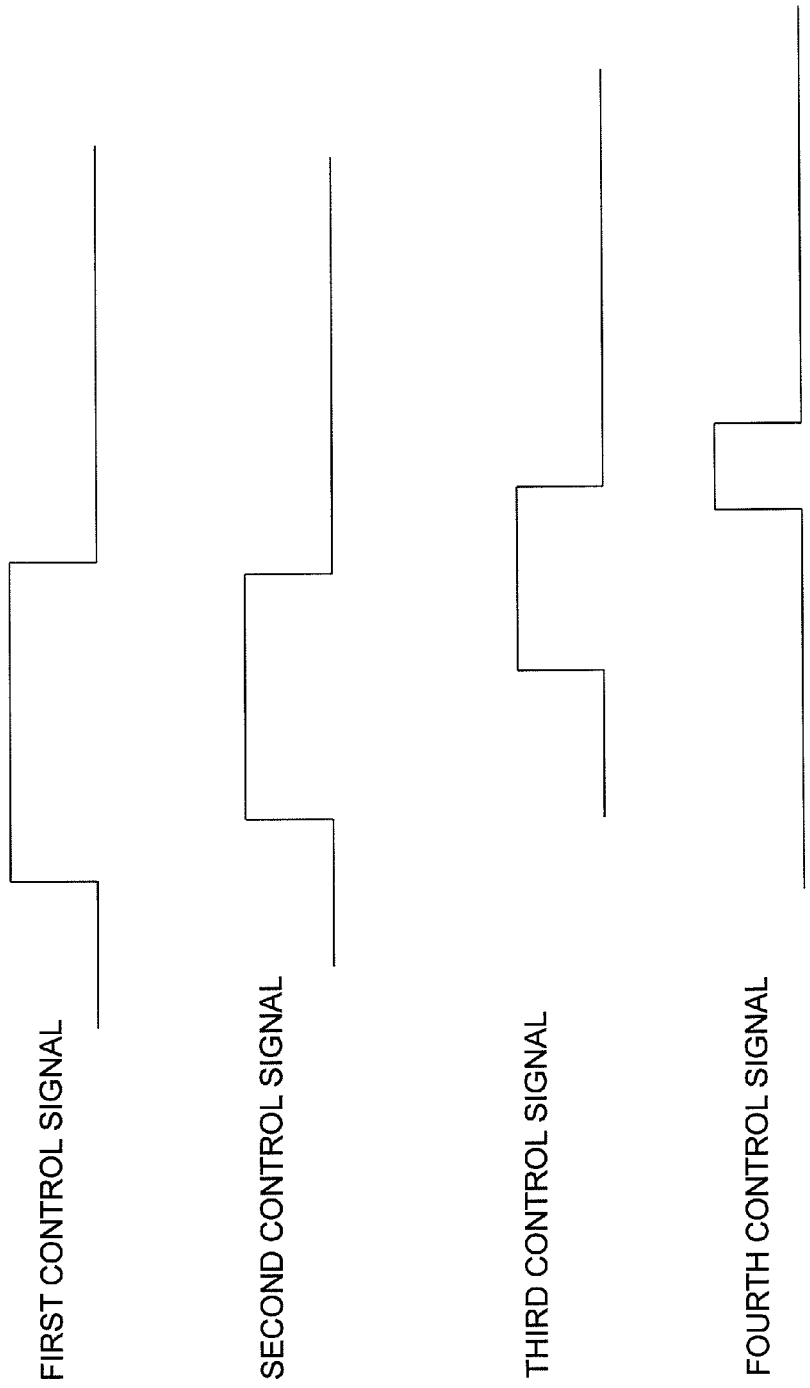
FIG. 4 is a timing chart illustrating the control signals in Embodiment 1 of the present invention.

FIG. 4 is a timing chart illustrating the control signals in Embodiment 1 of the present invention.

As illustrated in FIG. 4, the time to output the a first control signal is the longest. The time to output the second control signal is the second longest. The time to output the third control signal is the third longest. The time to output the fourth control signal is the shortest. In other words, the amount of time of the output in a fixed period becomes shorter in the order from the first control signal to the fourth control signal. Based on such amount of time of the output, the control unit 7 controls the first regulation unit 3 to the fourth regulation unit 6 in this priority order.

When the first regulation unit 3, the second regulation unit 4, the third regulation unit 5, and the fourth regulation unit 6 are controlled in this priority order, as described above, energy generation can be optimized.

(Frequency of Control Signals)

One of the priority orders is as follows: in terms of the frequency with which the control unit 7 outputs each of the first to fourth control signals in a fixed period, the first control signal≥the second control signal≥the third control signal≥the fourth control signal.

As is the case with the number of times each of the first to fourth control signals is outputted, when the order of frequency is from the first control signal to the fourth control signal, the control unit 7 can control the first regulation unit 3, the second regulation unit 4, the third regulation unit 5, and the fourth regulation unit 6 in this priority order. As a result, as described above, energy generation can be optimized.

(Output Order)

One of the priority orders is as follows: in terms of an order in which the control unit 7 outputs the first to fourth control signals in a fixed period, the first control signal≥the second control signal≥the third control signal≥the fourth control signal.

Figure 5:
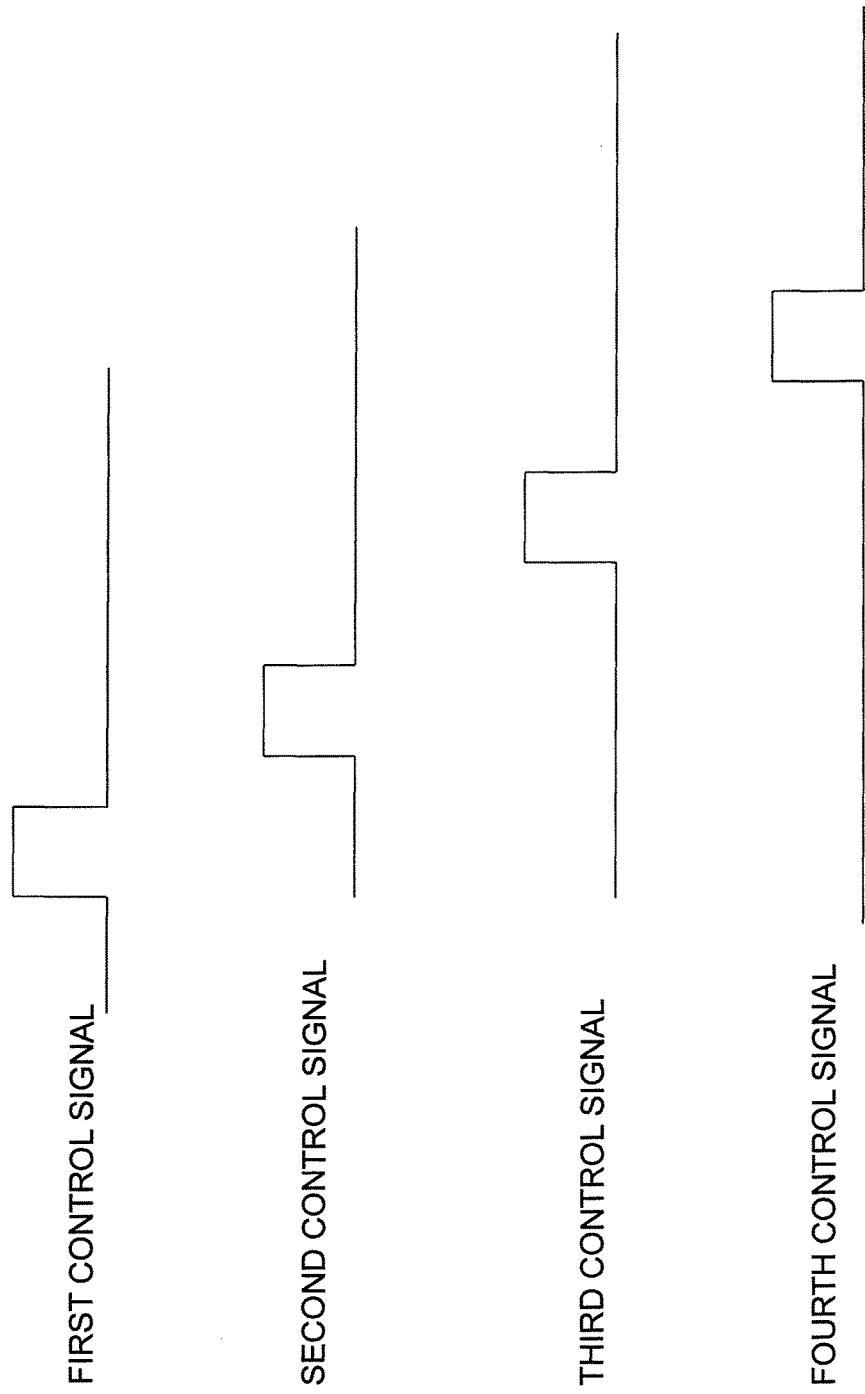
FIG. 5 is a timing chart illustrating the first to fourth control signals in Embodiment 1 of the present invention.

FIG. 5 is a timing chart illustrating the first to fourth control signals in Embodiment 1 of the present invention. As illustrated in FIG. 5, the control unit 7 outputs the first control signal, the second control signal, the third control signal, and the fourth control signal in this order. When an order of output in a fixed period is set as mentioned above, the first regulation unit 3, the second regulation unit 4, the third regulation unit 5, and the fourth regulation unit 6 are controlled in this order in the controller 1.

In other words, the control unit 7 controls the first regulation unit 3, the second regulation unit 4, the third regulation unit 5, and the fourth regulation unit 6 in this priority order.

Such control according to the priority order allows energy generation to be optimized as described above.

It should be noted that, using the number of times of the output, the amount of time of the output, the frequency, and the order of output in combination, the control unit 7 may assign priorities to the first regulation unit 3 to the fourth regulation unit 6. Alternatively, priorities may be assigned according to another criterion. These are just examples, and without being limited to the examples, the control unit 7 can perform the control according to a priority order.

As described above, the controller 1 in Embodiment 1 can optimize the efficiency of energy generation in the energy generation system by controlling the first regulation unit 3 to the fourth regulation unit 6 according to predetermined correlation and priority. In particular, the efficiency of energy generation with respect to energy used can be optimized.

(Embodiment 2)

Next, Embodiment 2 will be described. In Embodiment 2, the relationship between each of the regulation units and a corresponding one of the control signals.

(First Regulation Unit and First Control Signal)

The first regulation unit 3 regulates the discharge of non-permeating water from the forward osmosis membrane 2. As described in Embodiment 1, the control in the first regulation unit 3 is given a higher priority.

The first control signal controls this first regulation unit 3. The first control signal outputted from the control unit 7 controls an operation in the first regulation unit 3. The first regulation unit 3 includes, for example, a control valve 31 as illustrated in FIG. 6.

Figure 6:
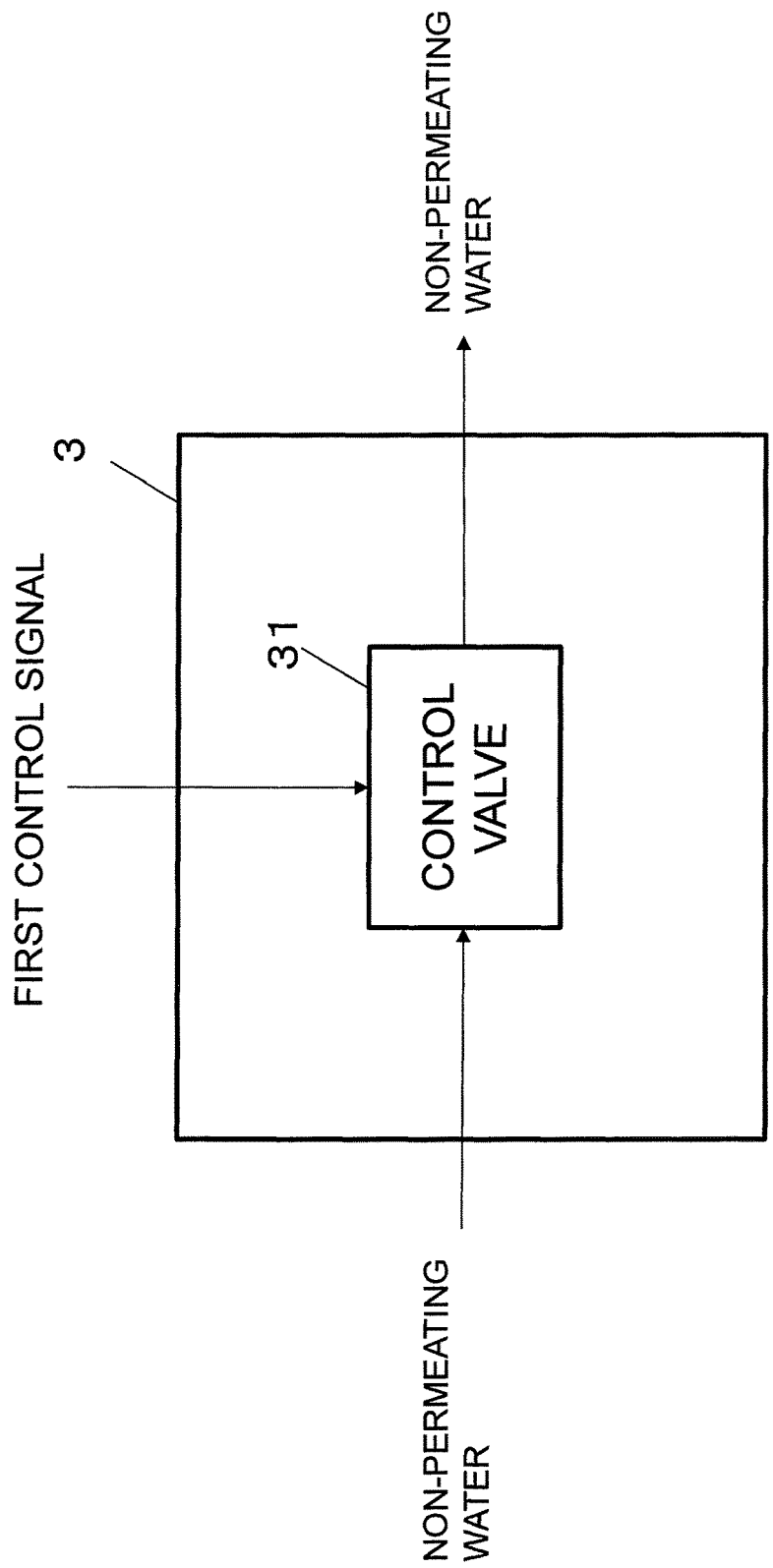
FIG. 6 is a block diagram illustrating a first regulation unit in Embodiment 2 of the present invention.

FIG. 6 is a block diagram illustrating the first regulation unit in Embodiment 2 of the present invention.

Based on the first control signal, the control valve 31 can change the degree of its own openness (sometimes closes itself), thereby regulating the discharge of non-permeating water from the forward osmosis membrane 2 to the outside. Here, the control valve 31 regulates the amount of discharge of non-permeating water so that the discharge amount is kept approximately constant. In other words, the first control signal controls the control valve 31 of the first regulation unit 3 so that the amount of discharge of non-permeating water is kept approximately constant.

When the first control signal controls the amount of discharge of non-permeating water so that the discharge amount is kept approximately constant, a waste of energy used due to variations of the amount of flow can be reduced as described above. As a result, the generation efficiency of energy generated with respect to energy used can be enhanced.

Based on the first control signal, the control valve 31 can change the degree of its own openness, thereby regulating the amount of discharge of non-permeating water so that the discharge amount is kept approximately constant. At this time, the first control signal may be inputted regularly to control the discharge of non-permeating water, or alternatively, may be inputted, for example, at regular intervals to control the discharge of non-permeating water.

(Second Control Signal and Second Regulation Unit)

Figure 7:
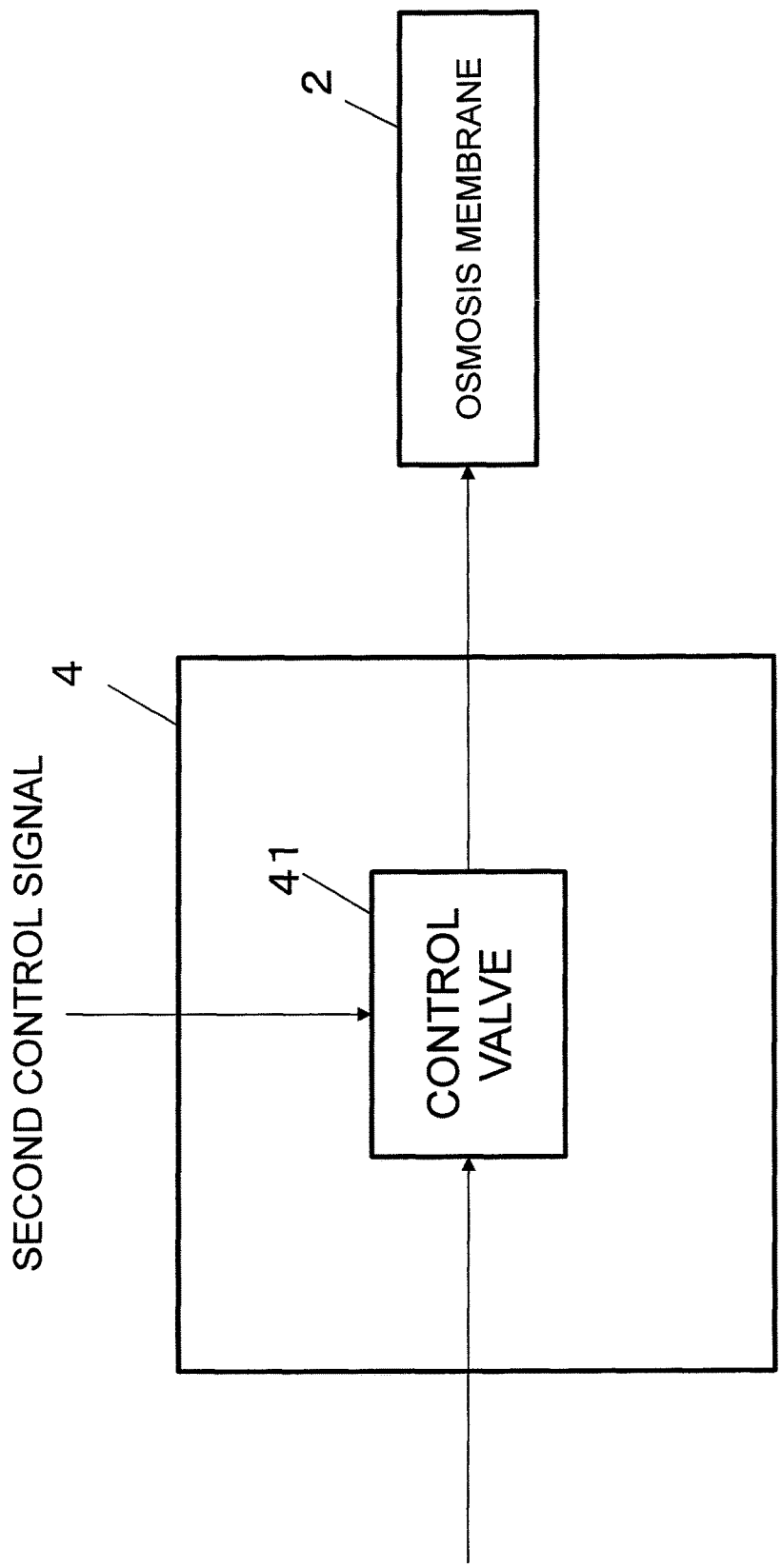
FIG. 7 is a block diagram illustrating a second regulation unit in Embodiment 2 of the present invention.

FIG. 7 is a block diagram illustrating a second regulation unit in Embodiment 2 of the present invention. The second regulation unit 4 regulates the supply of fresh water to the forward osmosis membrane 2. The second control signal is a signal for controlling this second regulation unit 4.

The second regulation unit 4 includes a control valve 41 thereinside. The second control signal controls the operation of this control valve 41. Here, the second control signal regulates the control valve 41 so that the supply pressure of fresh water to the forward osmosis membrane 2 is kept approximately constant. This regulation of the control valve 41 allows the second regulation unit 4 to regulate the supply pressure of fresh water to the forward osmosis membrane 2 so that the supply pressure is kept approximately constant. Alternatively, a pump is used in place of the control valve, and the number of revolutions of the pump is increased or decreased with an inverter, and, by such control of the pump, the supply pressure of fresh water may be made constant.

Fresh water supplied to the forward osmosis membrane 2 greatly affects the variation of the amount of permeation in the forward osmosis membrane 2. Furthermore, the fresh water greatly affects the amount of energy used in the supply of fresh water. Therefore, when the supply pressure of fresh water to be supplied to the forward osmosis membrane 2 is kept approximately constant, the variation of the amount of permeation is made smaller, and also an increase in energy used can be prevented.

Furthermore, it is also preferred that, based on at least one of the amount of discharge of the mixed water and the discharge pressure thereof, the second control signal regulates the second regulation unit 4.

The mixed water is discharged via the fourth regulation unit 6 and used for energy generation. In the case where the amount of discharge of this mixed water or the discharge pressure thereof changes, the supply of fresh water needs to be regulated. This is because, to produce the mixed water having a sufficient differential in the amount of flow, the supply of fresh water to the forward osmosis membrane 2 needs to be regulated.

(Third Control Signal and Third Regulation Unit)

The third control signal controls the third regulation unit 5 to keep the supply of salt water to the forward osmosis membrane 2 approximately constant. For example, the amount of supply of salt water to the forward osmosis membrane 2 is controlled to be kept at a constant level.

Figure 8:
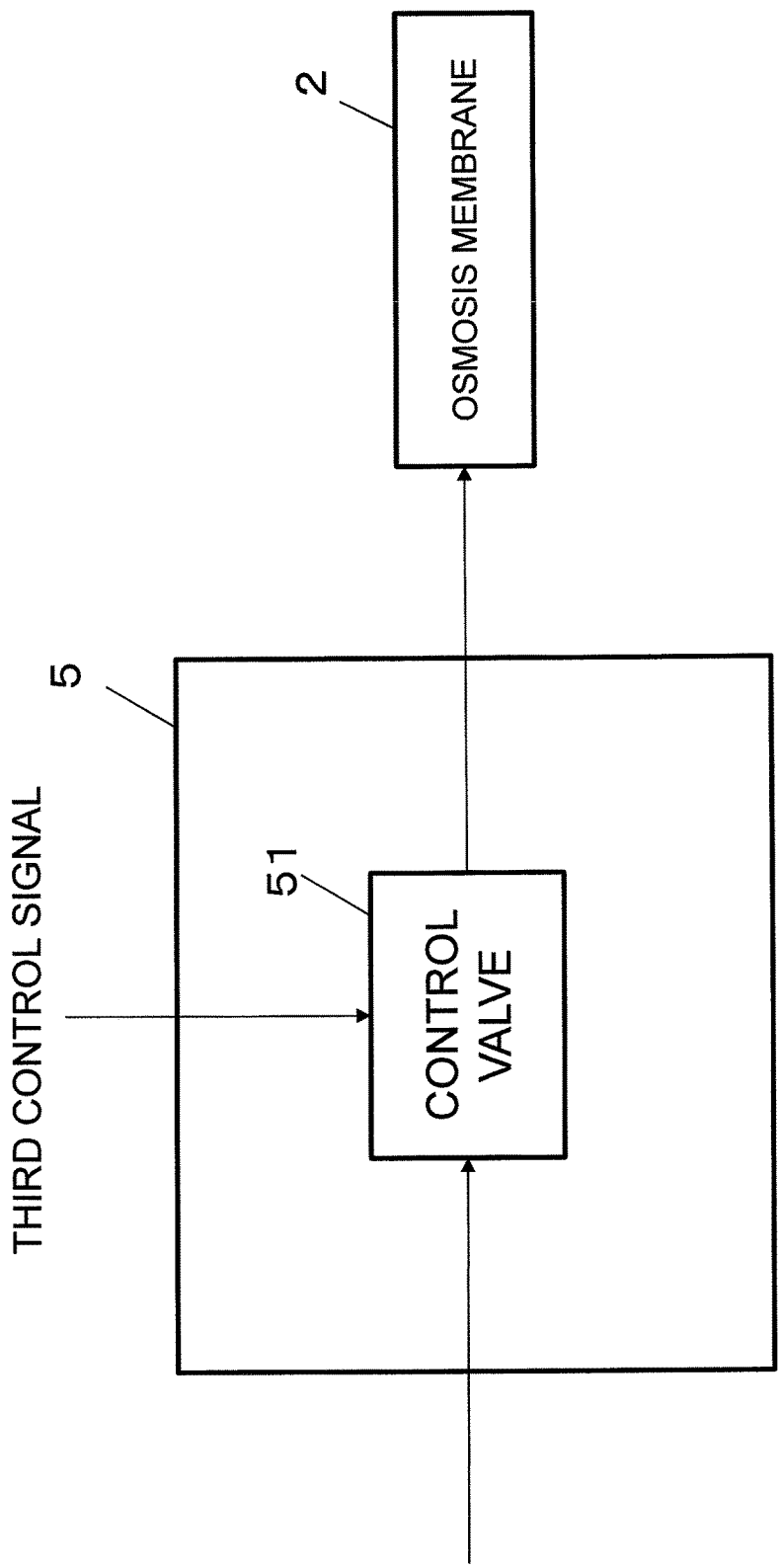
FIG. 8 is a block diagram illustrating a third regulation unit in Embodiment 2 of the present invention.

FIG. 8 is a block diagram illustrating the third regulation unit in Embodiment 2 of the present invention. The third regulation unit 5 includes a control valve 51. The third control signal controls the operation of this control valve 51, thereby controlling the third regulation unit 5. For example, by changing the degree of openness of the control valve 51 or changing the opening pressure, the third control signal controls the amount of supply of salt water in the third regulation unit 5. Alternatively, a pump is used in place of the control valve, and the number of revolutions of the pump is increased or decreased with an inverter, and, by such control of the pump, the amount of supply of fresh water may be made constant.

When the amount of supply of salt water to be supplied to the forward osmosis membrane 2 is regulated so as to be kept at a constant level, the impact on energy generation can be minimized. When the impact can be reduced, the efficiency of energy generation can be enhanced.

In particular, when the supply of salt water to the forward osmosis membrane 2 is maintained constant, the capability of producing the mixed water in the forward osmosis membrane 2 is kept constant, whereby the mixed water is more likely to have a maximum differential in the amount of flow. As a result, the efficiency of energy generation is enhanced.

(Fourth Control Signal and Fourth Regulation Unit)

Figure 9:
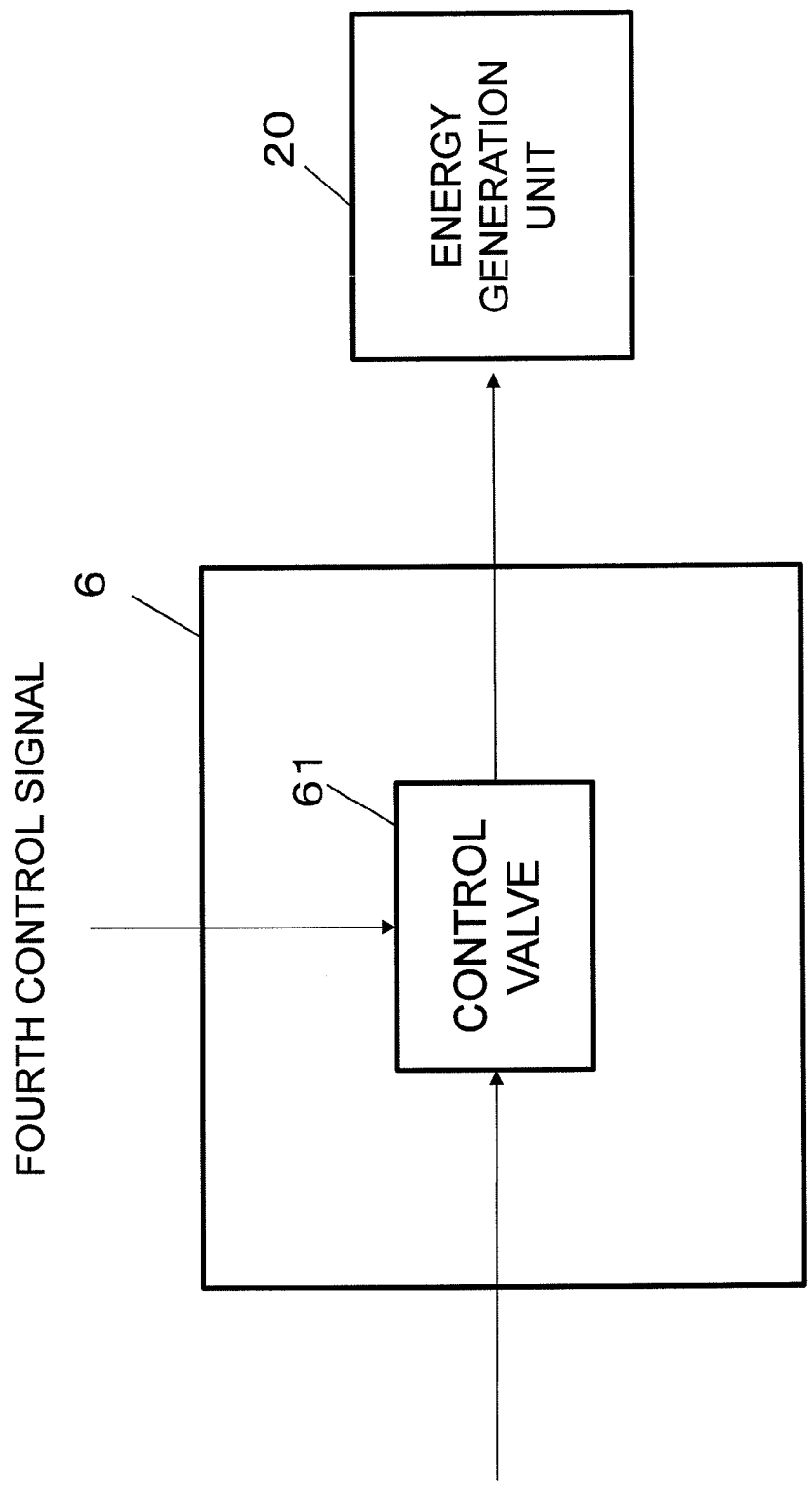
FIG. 9 is a block diagram illustrating a fourth regulation unit in Embodiment 2 of the present invention.

The fourth control signal controls the fourth regulation unit 6 so as to keep the discharge pressure of mixed water approximately constant. FIG. 9 is a block diagram illustrating the fourth regulation unit in Embodiment 2 of the present invention. The fourth regulation unit 6 regulates the discharge of the mixed water from the forward osmosis membrane 2 to the energy generation unit 20.

The fourth regulation unit 6 includes a control valve 61. This control valve 61 is capable of controlling the discharge pressure of the mixed water and the amount of discharge thereof by changing the degree of its own openness or the degree of pressurization.

The fourth control signal is a signal for controlling this control valve 61, and controls the discharge pressure of the mixed water so that the discharge pressure is kept approximately constant. This control valve 61 is controlled by the fourth control signal, whereby the fourth regulation unit 6 discharges the mixed water so as to keep the discharge pressure approximately constant. When the discharge pressure of the mixed water is kept approximately constant, the efficiency of energy generation in the energy generation unit 20 is enhanced.

Alternatively, based on the salt concentration of the mixed water, the fourth control signal may control the fourth regulation unit 6 so as to keep the discharge pressure of the mixed water approximately constant. The mixed water is outputted to the energy generation unit 20 and causes energy generation. In the energy generation by the mixed water, a change in the salt concentration, which means a change in osmotic pressure difference at that time, causes a change in the amount of osmotic flow in the forward osmosis membrane, which indicates a change in a differential in the amount of flow.

Since the mixed water causes energy generation with a differential in the amount of flow, the amount of osmotic flow in the forward osmosis membrane is preferably larger. However, when the pressure of the energy generation unit is blindly reduced for the purpose of increasing the amount of osmotic flow, although the amount of osmotic flow is increased, the amount of energy generated is decreased due to a low hydraulic pressure. Hence, an optimum pressure, which is present for every salt concentration, is regulated and maintained, whereby the mixed water has an optimum differential in the amount of flow.

Therefore, based on the salt concentration of the mixed water, the fourth control signal controls the fourth regulation unit 6 so as to kept the discharge pressure of the mixed water approximately constant. This control allows the fourth regulation unit 6 to discharge the mixed water while maintaining the mixed water at a constant pressure, and thereby the efficiency of energy generation to be optimized.

It should be noted that the first to fourth control signals may be controlled as described above in combination with each other, or may be each independently controlled. The control unit 7 outputs the first to fourth control signals in an appropriate combination thereof.

The controller 1 in Embodiment 2 is capable of regulating each of the first regulation unit 3 to the fourth regulation unit 6 while monitoring predetermined parameters. This regulation by monitoring allows the correlation and priority among the first regulation unit 3 to the fourth regulation unit 6 to be optimized, and thereby the efficiency of energy generation to be optimized.

(Embodiment 3)

Next, Embodiment 3 will be described. In Embodiment 3, an energy generation system that includes the controller 1 described in Embodiments 1 and 2 will be described.

Figure 10:
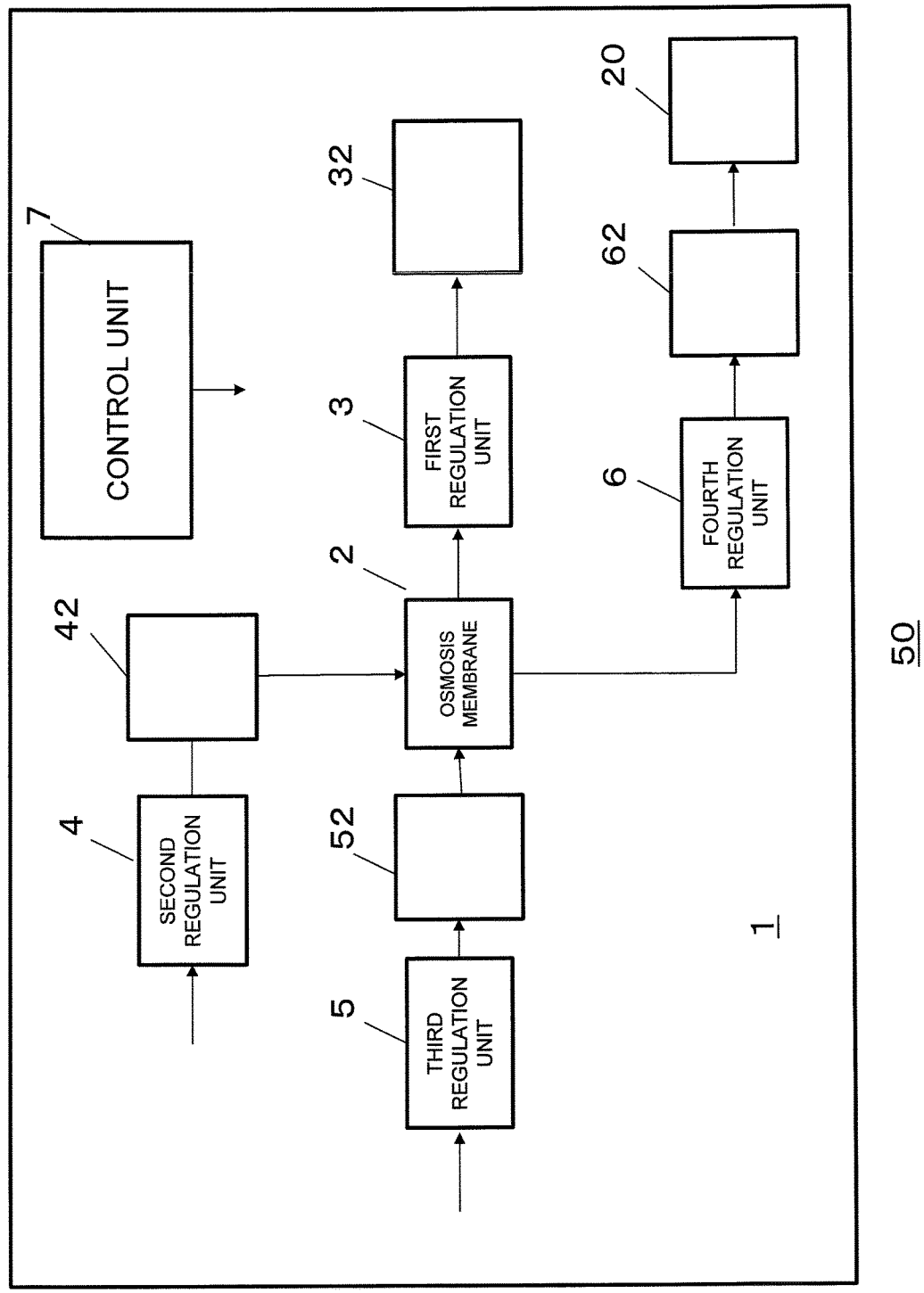
FIG. 10 is a block diagram illustrating an energy generation system in Embodiment 3 of the present invention.
Figure 11:
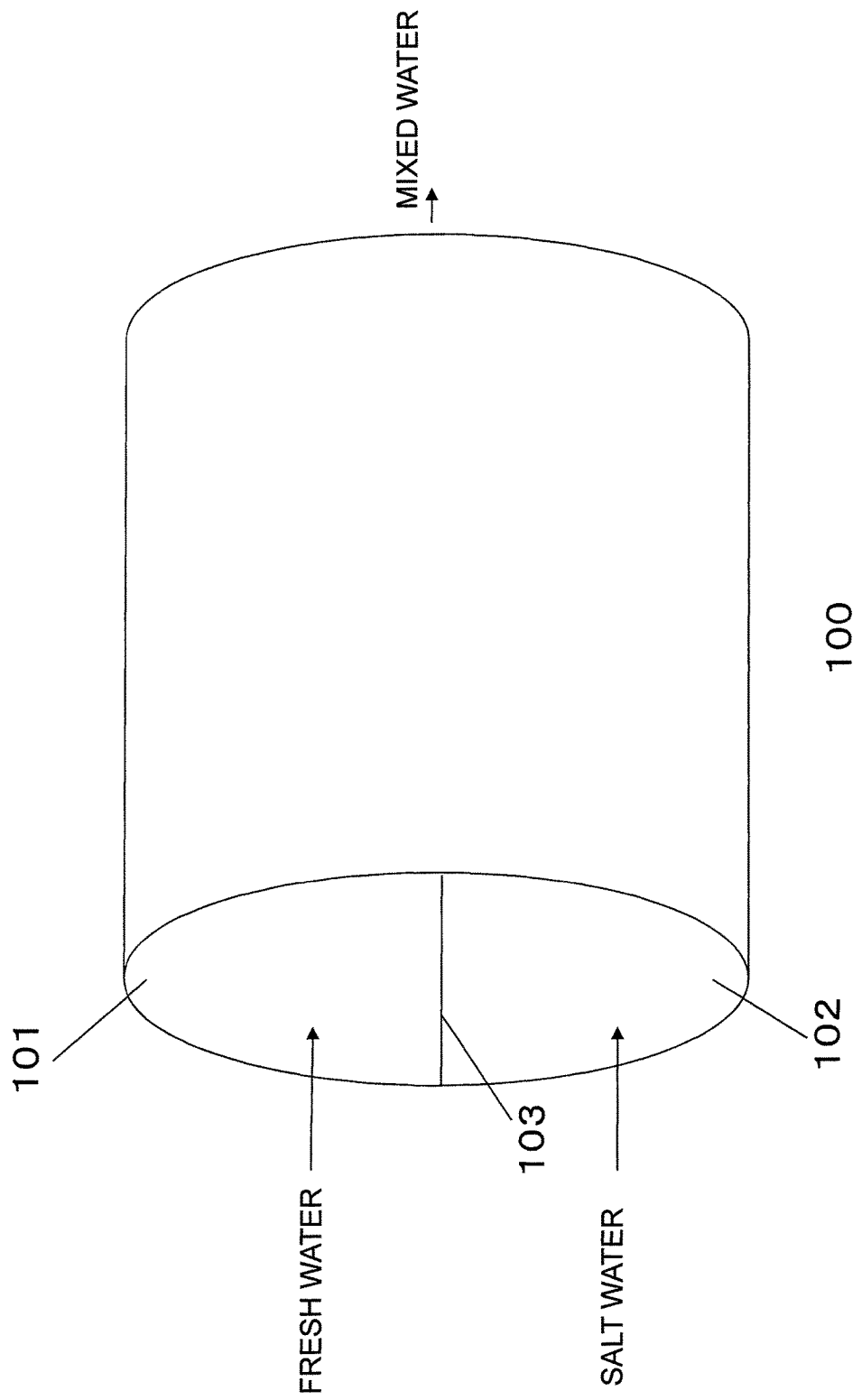
FIG. 11 is a schematic diagram illustrating the configuration of a forward osmosis membrane.
Figure 12:
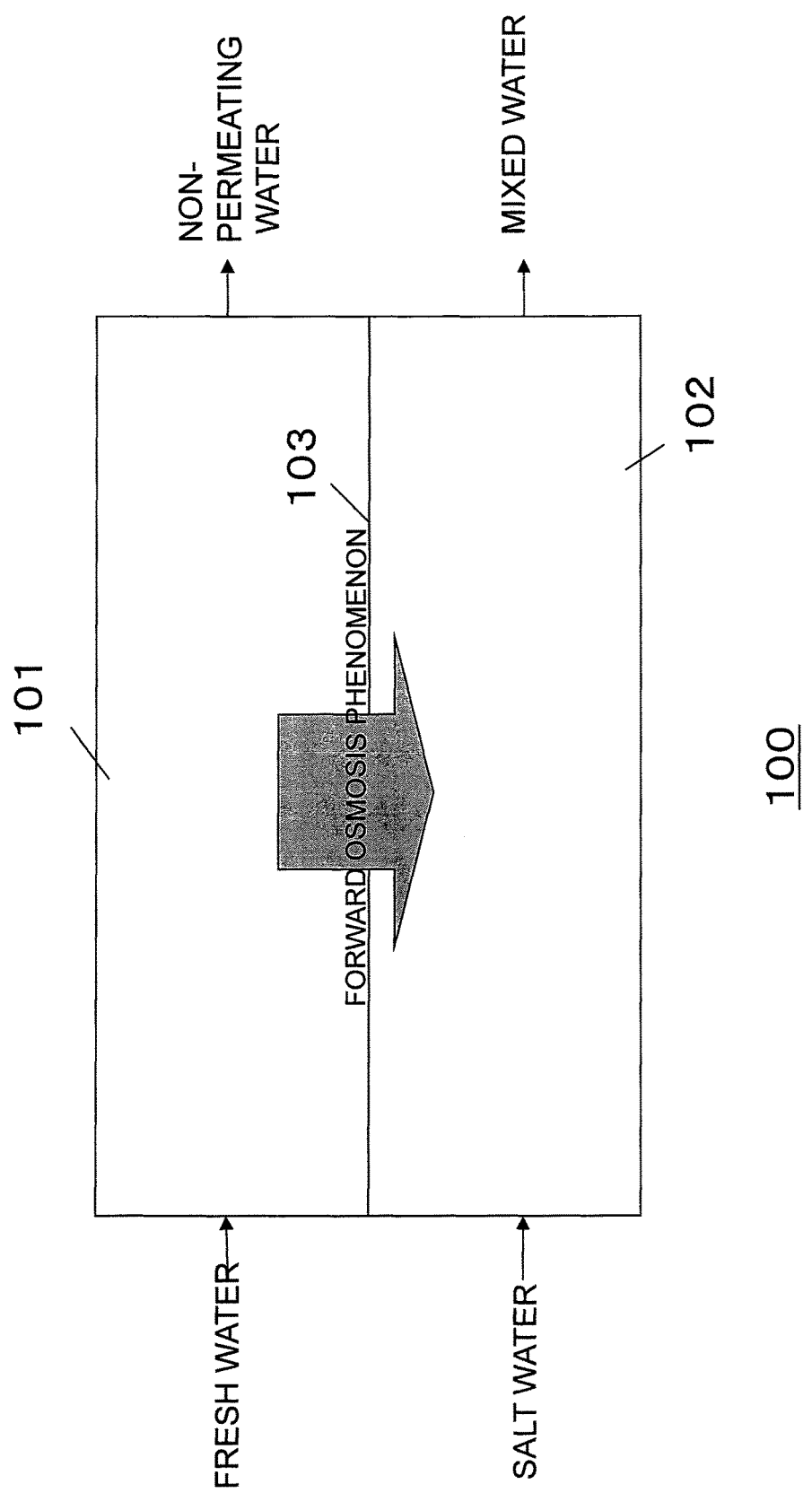
FIG. 12 is a schematic diagram for describing an osmosis phenomenon in the forward osmosis membrane.

FIG. 10 is a block diagram illustrating the energy generation system in Embodiment 3 of the present invention. FIG. 10 includes the controller 1 described in Embodiments 1 and 2. An energy generation system 50 includes the controller 1 described in Embodiments 1 and 2, a non-permeating-water discharge unit 32, a fresh water supply unit 42, a salt water supply unit 52, a mixed water discharge unit 62, and an energy generation unit 20.

The non-permeating-water discharge unit 32 discharges non-permeating water regulated by the first regulation unit 3. This discharge allows non-permeating water not having permeated in the forward osmosis membrane 2 to be discharged to the outside.

The fresh water supply unit 42 supplies fresh water regulated by the second regulation unit 4 to the forward osmosis membrane 2. In this supply, the optimized fresh water is supplied to the forward osmosis membrane 2.

The salt water supply unit 52 supplies salt water regulated by the third regulation unit 5 to the forward osmosis membrane 2. In this supply, the optimized salt water is supplied to the forward osmosis membrane 2.

The mixed water discharge unit 62 discharges the mixed water regulated by the fourth regulation unit 6 to the energy generation unit 20. In this supply, the optimized mixed water is supplied to the energy generation unit 20.

As described in Embodiments 1 and 2, the first regulation unit 3 to the fourth regulation unit 6 each perform regulation. Based on this regulation, the energy generation system 50 can perform optimum energy generation with respect to energy used.

Here, as described in Embodiments 1 and 2, the discharge of non-permeating water and the supply of fresh water are performed in a state in which pressure and the like are regulated based on predetermined monitoring. That is, the regulated salt water and the like mean salt water and the like whose pressures are optimized.

As described above, using the mixed water in the forward osmosis membrane 2, the energy generation system 50 in Embodiment 3 can generate energy at optimum efficiency.

It should be noted that the salt water desalination system described in Embodiments 1 to 2 is just one example for describing the spirit of the present invention, and the present invention may be changed or modified within a range not departing from the spirit of the present invention.

REFERENCE SIGNS LIST

1 . . . controller,
2 . . . forward osmosis membrane,
3 . . . first regulation unit,
4 . . . second regulation unit,
5 . . . third regulation unit,
6 . . . fourth regulation unit,
7 . . . control unit,
31, 41, 51, 61 . . . control valve,
32 . . . non-permeating-water discharge unit,
42 . . . fresh water supply unit,
52 . . . salt water supply unit,
62 . . . mixed water discharge unit,
20 . . . energy generation unit,
50 . . . energy generation system.

The invention claimed is:

1. An energy generation system, comprising:
    a forward osmosis membrane unit comprising a separation membrane therein and configured to fluidly communicate with a discharge of non-permeating water, a supply of fresh water, a supply of salt water and a discharge of mixed water resulting from water that permeates the separation membrane; and
    a controller comprising:
        a first regulator that regulates the discharge of non-permeating water, by a non-permeating water discharger, from the forward osmosis membrane unit;
        a second regulator that regulates the supply of fresh water, by a fresh water supplier, to the forward osmosis membrane unit;
        a third regulator that regulates the supply of salt water, by a salt water supplier, to the forward osmosis membrane unit;
        a fourth regulator that regulates the discharge of mixed water, by a mixed water discharger, from the forward osmosis membrane unit; and a regulation controller that controls:
the first regulator, the second regulator, the third regulator, and the fourth regulator,
wherein the regulation controller controls the first regulator, the second regulator, the third regulator, and the fourth regulator according to a priority order,
the first regulator including a first control valve configured to change an opening amount therein so as to regulate the discharge of the non-permeating water from the forward osmosis membrane unit upon receipt of a first control signal from the regulation controller,
the second regulator including one of a second control valve and a pump of the second regulator, wherein a second control signal from the regulation controller is configured to control the supply of fresh water to the forward osmosis membrane unit to be approximately constant,
the third regulator including one of a third control valve and a pump of the third regulator, wherein a third control signal from the regulation controller is configured to control the supply of salt water to the forward osmosis membrane unit to be approximately constant, and
the fourth regulator including a fourth control valve, wherein a fourth control signal from the regulation controller is configured to control the discharge pressure of the mixed water to be approximately constant, wherein
the priority order is based upon measures selected from a group comprising one of:
(i) a number of times the regulation controller outputs each of the control signals in a fixed period;
(ii) an amount of time the regulation controller outputs each of the control signals in a fixed period; and
(iii) a frequency with which the regulation controller outputs each of the control signals in a fixed period.

2. The energy generation system according to claim 1, wherein the forward osmosis membrane unit includes:
a salt water passage through which salt water supplied by the third regulator passes; and
a fresh water passage through which fresh water supplied by the second regulator passes, and
wherein the mixed water is produced by an osmosis phenomenon in the forward osmosis membrane unit.

3. The energy generation system according to claim 1, wherein the priority order is as follows: in terms of the number of times the regulation controller outputs each of the control signals in a fixed period,
the number of times each of the control signals are outputted satisfying the following relation:
the first control signal≥the second control signal≥the third control signal≥the fourth control signal.

4. The energy generation system according to claim 1, wherein the priority order is as follows: in terms of the amount of time the regulation controller outputs each of the control signals in a fixed period,
the amount of time each of the control signals are outputted satisfying the following relation:
the first control signal≥the second control signal≥the third control signal≥the fourth control signal.

5. The energy generation system according to claim 1, wherein the priority order is as follows: in terms of the frequency with which the regulation controller outputs each of the control signals in a fixed period,
the frequency of the control signals being outputted to satisfy the following relation:
the first control≥signal the second control signal≥the third control≥signal the fourth control signal.

6. The energy generation system according to claim 1, wherein the priority order is such that an order in which the regulation controller outputs the control signals in a fixed period is
the first control signal, the second control signal, the third control signal, and then the fourth control signal.

7. The energy generation system according to claim 1, wherein the first control signal controls the first regulator so as to keep the discharge of non-permeating water approximately constant.

8. The energy generation system according to claim 1, wherein the second control signal controls the second regulator so as to keep a supply pressure of fresh water to the forward osmosis membrane unit approximately constant.

9. The energy generation system according to claim 8, wherein the second control signal controls the second regulator, based on at least one of an amount of discharge of the mixed water and a discharge pressure of the mixed water.

10. The energy generation system according to claim 1, wherein the third control signal controls the third regulator so as to keep the supply of salt water to the forward osmosis membrane unit approximately constant.

11. The energy generation system according to claim 1, wherein the fourth control signal controls the fourth regulator so as to keep a discharge pressure of the mixed water approximately constant.

12. The energy generation system according to claim 11, wherein the fourth control signal controls the fourth regulator, based on a salt concentration of the mixed water, so as to keep the discharge pressure of the mixed water approximately constant.

\* \* \* \* \*